United States Patent
Seo et al.

(10) Patent No.: US 12,344,983 B2
(45) Date of Patent: Jul. 1, 2025

(54) SYSTEMS AND METHODS FOR DRAIN PUMP AND HUMIDITY SENSOR OPERATION VERIFICATION

(71) Applicant: Haier US Appliance Solutions, Inc., Wilmington, DE (US)

(72) Inventors: Wonmyung Seo, Seongnam (KR); Seong Hoon Ryu, Suwon (KR); Taehyun Yoon, Gyeonggi (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 188 days.

(21) Appl. No.: 17/954,873

(22) Filed: Sep. 28, 2022

(65) Prior Publication Data
US 2024/0102223 A1   Mar. 28, 2024

(51) Int. Cl.
*D06F 34/14*   (2020.01)
*D06F 23/02*   (2006.01)
*D06F 33/42*   (2020.01)
*D06F 33/47*   (2020.01)
*D06F 39/08*   (2006.01)
*D06F 39/14*   (2006.01)
(Continued)

(52) U.S. Cl.
CPC .............. *D06F 34/14* (2020.02); *D06F 23/02* (2013.01); *D06F 33/42* (2020.02); *D06F 33/47* (2020.02); *D06F 39/085* (2013.01); *D06F 39/14* (2013.01); *G01M 99/005* (2013.01); *D06F 2101/00* (2020.02); *D06F 2103/34* (2020.02); *D06F 2105/08* (2020.02); *D06F 2105/58* (2020.02)

(58) Field of Classification Search
CPC .......... D06F 23/02; D06F 33/42; D06F 33/47; D06F 33/74; D06F 34/14; D06F 34/26; D06F 39/085; D06F 39/14; D06F 2103/08; D06F 2103/34; D06F 2105/08; D06F 2105/22; D06F 2105/58
See application file for complete search history.

(56) References Cited

U.S. PATENT DOCUMENTS

| 8,187,387 B2 | 5/2012 | Kim et al. | |
| 2012/0124859 A1* | 5/2012 | May | D06F 34/28 |
| | | | 34/572 |

(Continued)

FOREIGN PATENT DOCUMENTS

| JP | H11290593 A | 10/1999 | |
| JP | 2021035485 A * | 3/2021 | D06F 15/00 |

OTHER PUBLICATIONS

Machine translation of JP 2021-035485 A to Wakita et al. (Year: 2021).*

*Primary Examiner* — Joseph L. Perrin
(74) *Attorney, Agent, or Firm* — Dority & Manning, P.A.

(57) ABSTRACT

A pump is configured to drain liquid from the wash basket. A vent line extends between the wash basket and the cabinet. The vent line includes a fan, a humidity sensor proximate the fan, and a controller. The controller is operable to perform a drain cycle. The drain cycle includes activating the pump. Comparing, across a set interval of time, a humidity within the washing machine appliance to a reference humidity. Determining the humidity's proximity to the reference humidity. Detecting a fault in the drain cycle in response to the humidity exceeding the reference humidity. Continuing a rinse cycle in response to the humidity being proximate the reference humidity.

20 Claims, 7 Drawing Sheets

(51) Int. Cl.
*D06F 103/34* (2020.01)
*D06F 105/08* (2020.01)
*D06F 105/58* (2020.01)
*G01M 99/00* (2011.01)
*D06F 101/00* (2020.01)

(56) References Cited

U.S. PATENT DOCUMENTS

2013/0104607 A1* 5/2013 Broitzman .............. D06F 29/00
　　　　　　　　　　　　　　　　　　　　　　　68/13 R
2021/0017686 A1　1/2021 Chang et al.

* cited by examiner

SYSTEMS AND METHODS FOR DRAIN PUMP AND HUMIDITY SENSOR OPERATION VERIFICATION

FIELD OF THE INVENTION

The present subject matter relates generally to systems and methods for verifying the operation of a drain pump and a humidity sensor, particularly in the drain cycle of washing machine appliances.

BACKGROUND OF THE INVENTION

Washing machine appliances generally include a wash tub for containing water or wash fluid (e.g., water, detergent, bleach, or other wash additives). A basket is rotatably mounted within the wash tub and defines a wash chamber for receipt of articles for washing. During normal operation of such washing machine appliances, the wash fluid is directed into the wash tub and onto articles within the wash chamber of the basket. The basket or an agitation element can rotate at various speeds to agitate articles within the wash chamber, to wring wash fluid from articles within the wash chamber, etc.

Some existing washing machine appliances, such as horizontal axis washing machines, are provided with one or more ventilation features. Further, some existing washing machines are equipped to dry articles in the appliance as well. In order to effectively dry articles in the appliance, the moisture from the wash cycle must be removed from the basket. Thus, drain pumps traditionally operate to reduce the moisture from accumulating within the tub. Additionally, such features may allow a washing machine appliance to exchange air between the wash tub and the ambient environment. The exchange of air may be necessary to dry the articles in the tub and/or prevent moisture from accumulating within the tub. For example, if the tub is not ventilated, moist, stagnant air may form within the washing machine.

BRIEF DESCRIPTION OF THE INVENTION

Aspects and advantages of the invention will be set forth in part in the following description, or may be apparent from the description, or may be learned through practice of the invention.

In one example embodiment, a washing machine appliance includes a cabinet with a wash tub positioned within the cabinet, and a wash basket rotatably mounted within the wash tub and accessible through an opening in the cabinet. A door is pivotably mounted to the cabinet, and the door is pivotable between an open position and a closed position. The door permits access to the wash basket through the opening when in the open position. An aperture in the cabinet is in fluid communication with an ambient environment external to the cabinet when the door is in the closed position. A pump is configured to drain liquid from the wash basket. A vent line extends between the wash tub and the aperture on the cabinet. The vent line includes a fan, a humidity sensor, and a controller. The controller is configured to activate the pump during a drain cycle of a wash cycle. The controller is also configured to compare, across a set interval of time, a humidity measurement within the washing machine appliance to a reference humidity value. The controller is also configured to detect a fault in the drain cycle in response to the humidity exceeding the reference humidity, and continue the wash cycle a rinse cycle in response to the humidity proximate the reference humidity.

In another example embodiment, a method of operating a drain cycle in a washing machine appliance. The washing machine appliance includes a cabinet with a wash tub positioned within the cabinet, and a wash basket rotatably mounted within the wash tub and accessible through an opening in the cabinet. A door is pivotably mounted to the cabinet, and the door is pivotable between an open position and a closed position. The door permits access to the wash basket through the opening when in the open position. An aperture in the cabinet is in fluid communication with an ambient environment external to the cabinet when the door is in the closed position. A pump is configured to drain liquid from the wash basket. A vent line extends between the wash tub and the aperture on the cabinet. The vent line includes a fan, a humidity sensor, and a controller. The method includes activating, by the controller, the pump during a drain cycle, and comparing, by the controller, across a set interval of time, a difference in a humidity measurement from the humidity sensor to a reference humidity value. Then detecting, at the controller, a fault in the drain cycle in response to the measured humidity exceeding the reference humidity value, and continuing, at the controller, a rinse cycle in response to the humidity proximate the reference humidity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
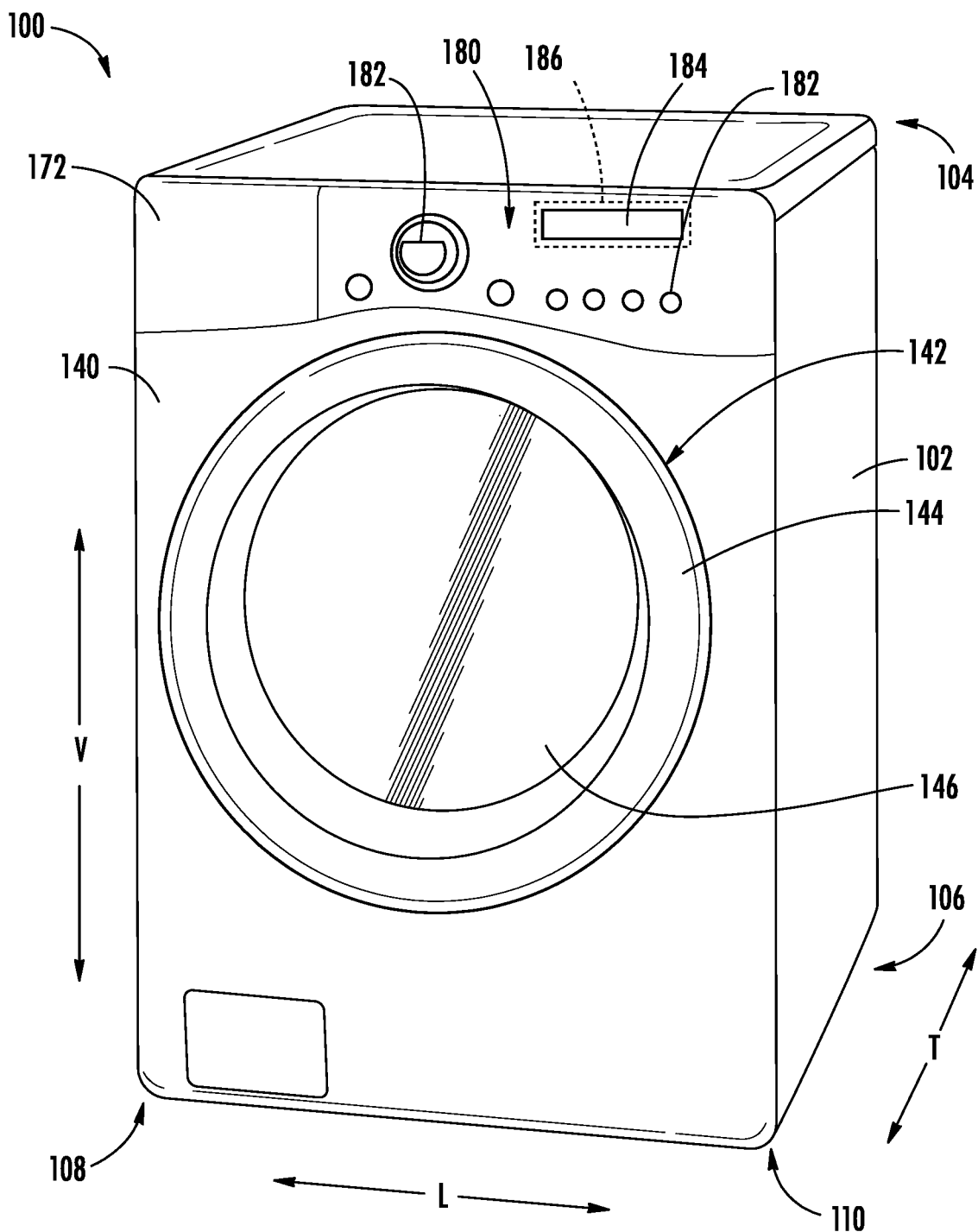
FIG. 1 provides a perspective view of a washing machine appliance according to one or more exemplary embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one element from another and are not intended to signify location or importance of the individual elements. Terms such as "inner" and "outer" refer to relative directions with respect to the interior and exterior of the washing machine appliance, and in particular the wash basket therein. For example, "inner" or "inward" refers to the direction towards the interior of the washing machine appliance. Terms such as "left," "right," "front," "back," "top," or "bottom" are used with reference to the perspective of a user accessing the washing machine appliance. For example, a user stands in front of the washing machine appliance to open the door and reaches into the wash basket to access items therein. Furthermore, it should be appreciated that as used herein, terms of approximation, such as "approximately," "substantially," or "about," refer to being within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
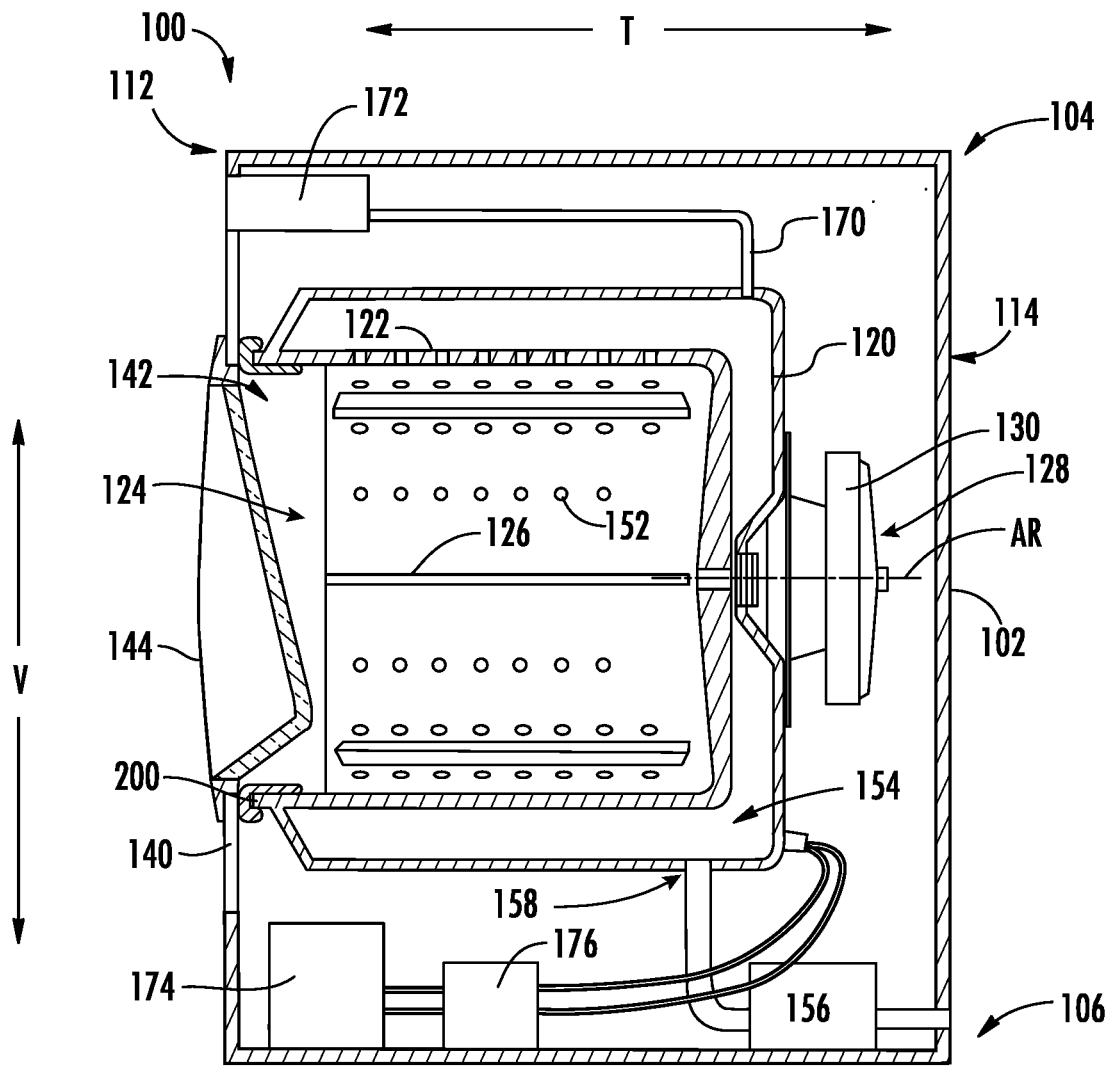
FIG. 2 provides a cross-sectional side view of the exemplary washing machine appliance.

Referring now to the figures, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction L, and between a front 112 and a rear 114 along the transverse direction T.

Referring to FIG. 2, a wash tub 120 is positioned within cabinet 102 and is generally configured for retaining wash fluids during an operating cycle. As used herein, "wash fluid" may refer to water, detergent, fabric softener, bleach, or any other suitable wash additive or combination thereof. A wash basket 122 is received within wash tub 120 and defines a wash chamber 124 that is configured for receipt of articles for washing. More specifically, wash basket 122 is rotatably mounted within wash tub 120 such that it is rotatable about an axis of rotation AR. According to the illustrated embodiment, the axis of rotation is substantially parallel to the transverse direction T. In this regard, washing machine appliance 100 is generally referred to as a "horizontal axis" or "front load" washing machine appliance 100. However, it should be appreciated that aspects of the present subject matter may be used within the context of a vertical axis or top load washing machine appliance as well.

Wash basket 122 may define one or more agitator features that extend into wash chamber 124 to assist in agitation and cleaning articles disposed within wash chamber 124 during operation of washing machine appliance 100. For example, as illustrated in FIG. 2, a plurality of ribs 126 extends from basket 122 into wash chamber 124. In this manner, for example, ribs 126 may lift articles disposed in wash basket 122 during rotation of wash basket 122.

Washing machine appliance 100 includes a drive assembly 128 which is coupled to wash tub 120 and is generally configured for rotating wash basket 122 during operation, e.g., such as during an agitation or spin cycle. More specifically, as best illustrated in FIG. 2, drive assembly 128 may include a motor assembly 130 that is in mechanical communication with wash basket 122 to selectively rotate wash basket 122 (e.g., during an agitation or a rinse cycle of washing machine appliance 100). According to the illustrated embodiment, motor assembly 130 is a pancake motor. However, it should be appreciated that any suitable type, size, or configuration of motors may be used to rotate wash basket 122 according to alternative embodiments. In addition, drive assembly 128 may include any other suitable number, types, and configurations of support bearings or drive mechanisms.

Referring generally to FIGS. 1 and 2, cabinet 102 also includes a front panel 140 that defines an opening 142 that permits user access to wash basket 122. More specifically, washing machine appliance 100 includes a door 144 that is positioned over opening 142 and is rotatably, e.g., pivotably, mounted to front panel 140 (e.g., about a door axis that is substantially parallel to the vertical direction V). In this manner, door 144 permits selective access to opening 142 by being movable between an open position (not shown) facilitating access to a wash tub 120 and a closed position (FIG. 1) prohibiting access to wash tub 120. For example, when the door 144 is in the closed position, the wash tub 120 may be generally enclosed (e.g., at least 90% enclosed and at least 90% surrounded on all sides, such as fully enclosed with the exception of a vent line 190 and/or vent aperture 202 as will be described below) by the door 144 and the cabinet 102. A gasket 200 may be provided in the opening 142 and the gasket 200 may sealingly engage the door 144 when the door 144 is in the closed position. For example, the gasket 200 may extend between the tub 120 and the front panel 140, e.g., generally along the transverse direction T and may extend about or around the opening 142 such that the gasket 200 is covered by the door 144 when the door 144 is in the closed position, and the gasket 200 may promote sealing between the door 144 and the cabinet 102, e.g., the front panel 140 of the cabinet 102.

In some embodiments, a window 146 in door 144 permits viewing of wash basket 122 when door 144 is in the closed position (e.g., during operation of washing machine appliance 100). Door 144 also includes a handle (not shown) that, for example, a user may pull when opening and closing door 144. Further, although door 144 is illustrated as mounted to front panel 140, it should be appreciated that door 144 may be mounted to another side of cabinet 102 or any other suitable support according to alternative embodiments.

Referring again to FIG. 2, wash basket 122 also defines a plurality of perforations 152 in order to facilitate fluid communication between an interior of basket 122 and wash tub 120. A sump 154 is defined by wash tub 120 at a bottom of wash tub 120 along the vertical direction V. Thus, sump 154 is configured for receipt of, and generally collects, wash fluid during operation of washing machine appliance 100. For example, during operation of washing machine appliance 100, wash fluid may be urged (e.g., by gravity) from basket 122 to sump 154 through the plurality of perforations 152. A pump assembly 156 is located beneath wash tub 120 for gravity assisted flow when draining wash tub 120 (e.g., via a drain 158). Pump assembly 156 is also configured for recirculating wash fluid within wash tub 120. Accordingly, pump assembly 156 may also be referred to or include a drain pump and/or a circulation pump.

Referring still to FIGS. 1 and 2, in some embodiments, washing machine appliance 100 may include an additive dispenser or spout 170. For example, spout 170 may be in fluid communication with a water supply (not shown) in order to direct fluid (e.g., clean water) into wash tub 120. Spout 170 may also be in fluid communication with the sump 154. For example, pump assembly 156 may direct wash fluid disposed in sump 154 to spout 170 in order to circulate wash fluid in wash tub 120.

As illustrated, a detergent drawer 172 may be slidably mounted within front panel 140. Detergent drawer 172 receives a wash additive (e.g., detergent, fabric softener, bleach, or any other suitable liquid or powder) and directs the fluid additive to wash chamber 124 during operation of washing machine appliance 100. According to the illustrated embodiment, detergent drawer 172 may also be fluidly coupled to spout 170 to facilitate the complete and accurate dispensing of wash additive.

In some embodiments, an optional bulk reservoir 174 may be disposed within cabinet 102. Bulk reservoir 174 may be configured for receipt of fluid additive for use during operation of washing machine appliance 100. Moreover, bulk reservoir 174 may be sized such that a volume of fluid additive sufficient for a plurality or multitude of wash cycles of washing machine appliance 100 (e.g., five, ten, twenty, fifty, or any other suitable number of wash cycles) may fill bulk reservoir 174. Thus, for example, a user can fill bulk reservoir 174 with fluid additive and operate washing machine appliance 100 for a plurality of wash cycles without refilling bulk reservoir 174 with fluid additive. A reservoir pump 176 may be configured for selective delivery of the fluid additive from bulk reservoir 174 to wash tub 120.

A control panel 180 including a plurality of input selectors 182 may be coupled to front panel 140. Control panel 180 and input selectors 182 collectively form a user interface input for operator selection of machine cycles and features. A display 184 of control panel 180 indicates selected features, operation mode, a countdown timer, and/or other items of interest to appliance users regarding operation.

Operation of washing machine appliance 100 is controlled by a processing device or a controller 186 that is operatively coupled to control panel 180 for user manipulation to select washing machine cycles and features. In response to user manipulation of control panel 180, controller 186 operates the various components of washing machine appliance 100 to execute selected machine cycles and features. Controller 186 may include a memory and microprocessor, such as a general or special purpose microprocessor operable to execute programming instructions or micro-control code associated with methods described herein. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 186 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 180 may be in communication with controller 186 via one or more signal lines or shared communication busses to provide signals to and/or receive signals from the controller 186.

In addition, the memory or memory devices of the controller 186 can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 186 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 186 as disclosed herein is capable of and may be operable to perform any methods, method steps, or portions of methods as disclosed herein. For example, in some embodiments, methods disclosed herein may be embodied in programming instructions stored in the memory and executed by controller 186.

The memory devices may also store data that can be retrieved, manipulated, created, or stored by the one or more processors or portions of controller 186. The data can include, for instance, data to facilitate performance of methods described herein. The data can be stored locally (e.g., on controller 186) in one or more databases and/or may be split up so that the data is stored in multiple locations. In addition, or alternatively, the one or more database(s) can be connected to controller 186 through any suitable network(s), such as through a high bandwidth local area network (LAN) or wide area network (WAN). In this regard, for example, controller 186 may further include a communication module or interface that may be used to communicate with one or more other component(s) of washing machine appliance 100, controller 186, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

In exemplary embodiments, during operation of washing machine appliance 100, laundry items are loaded into wash basket 122 through opening 142, and a wash operation is initiated through operator manipulation of input selectors 182. For example, a wash cycle may be initiated such that wash tub 120 is filled with water, detergent, or other fluid additives (e.g., via detergent drawer 172 or bulk reservoir 174). One or more valves (not shown) can be controlled by washing machine appliance 100 to provide for filling wash basket 122 to the appropriate level for the amount of articles being washed or rinsed. By way of example, once wash basket 122 is properly filled with fluid, the contents of wash basket 122 can be agitated (e.g., with ribs 126) for an agitation phase of laundry items in wash basket 122. During the agitation phase, the basket 122 may be motivated about the axis of rotation AR at a set speed (e.g., first speed or tumble speed). As the basket 122 is rotated, articles within the basket 122 may be lifted and permitted to drop therein.

After the agitation phase of the washing operation is completed, wash tub 120 can be drained, e.g., by drain pump assembly 156. Operation of drain pump assembly will be described further below. Laundry articles can then be rinsed (e.g., through a rinse cycle) by again adding fluid to wash tub 120, depending on the particulars of the cleaning cycle selected by a user. Ribs 126 may again provide agitation within wash basket 122. One or more spin cycles may also be used. In particular, a spin cycle may be applied after the wash cycle or after the rinse cycle in order to wring wash fluid from the articles being washed. During a spin cycle, basket 122 is rotated at relatively high speeds. For instance, basket 122 may be rotated at one set speed (e.g., second speed or pre-plaster speed) before being rotated at another set speed (e.g., third speed or plaster speed). As would be understood, the pre-plaster speed may be greater than the tumble speed and the plaster speed may be greater than the pre-plaster speed. Moreover, agitation or tumbling of articles may be reduced as basket 122 increases its rotational velocity such that the plaster speed maintains the articles at a generally fixed position relative to basket 122. After articles disposed in wash basket 122 are cleaned (or the washing operation otherwise ends), a user can remove the articles from wash basket 122 (e.g., by opening door 144 and reaching into wash basket 122 through opening 142).

During such operations, the gasket 200 may help to contain wash fluid within the cabinet 102, particularly within the tub 120. As generally shown in FIG. 2, the gasket 200 may be positioned between the door 144 and the tub 120, e.g., when the door 144 is in the closed position as in FIG. 2. Thus, the gasket 200 may sealingly engage the door 144 when the door 144 is in the closed position. In general, the gasket 200 sealingly engages the cabinet 102, in particular the opening 142 thereof, the tub 120, and the door 144. For example, the gasket 200 may extend around the opening 142 along a perimeter, e.g., circumference, of the opening 142 and may extend between the cabinet 102 and the wash tub 120 along a longitudinal axis, such as along or generally parallel to the transverse direction T.

After completion of the wash cycle, as described above, moisture can become trapped within the washing machine appliance 100, e.g., in wash tub 120 and/or gasket 200. This may promote growth and/or spread of odors, mold, and/or mildew on the components of washing machine appliance 100 and on the laundry articles within wash basket 122. Accordingly, in accordance with exemplary aspects of the present disclosure, after or between such wash cycles, washing machine appliance 100 may be operated in a ventilation cycle to remove moisture from within the washing machine appliance 100.

It should be appreciated that the present subject matter is not limited to any particular style, model, or configuration of washing machine appliance. The exemplary embodiment depicted in FIGS. 1 and 2 is simply provided for illustrative purposes only. While described in the context of a specific embodiment of horizontal axis washing machine appliance 100, it will be understood that horizontal axis washing machine appliance 100 is provided by way of example only. Other washing machine appliances having different configurations, different appearances, and/or different features may also be utilized with the present subject matter as well. For example, different locations may be provided for the user interface, different configurations may be provided, e.g., vertical axis washing machines, and other differences may be applied as well.

Figure 3:
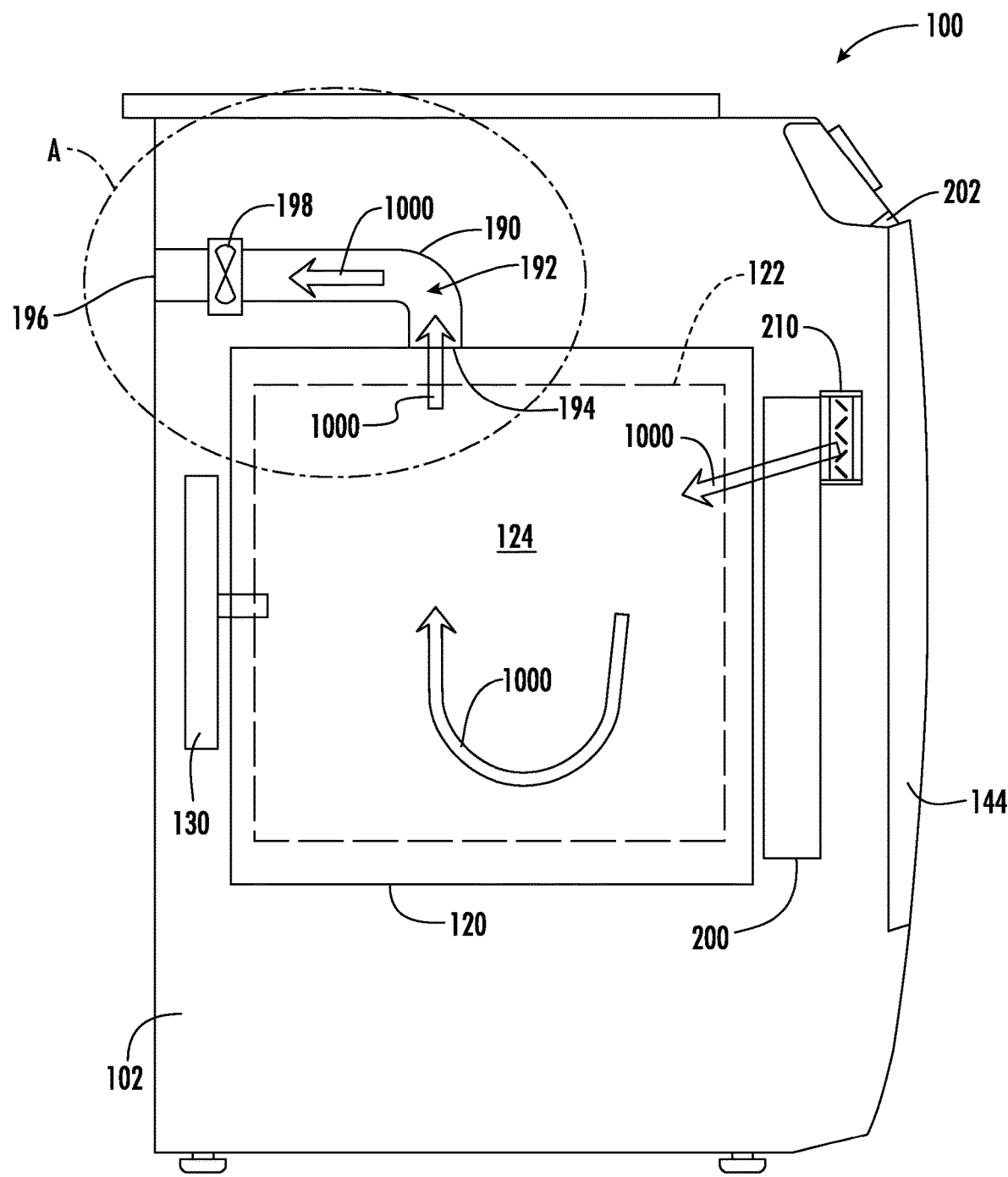
FIG. 3 provides a schematic side view of an exemplary washing machine appliance according to one or more exemplary embodiments of the present disclosure.

As illustrated in FIG. 3, in some embodiments, a ventilation line 190 is provided within washing machine appliance 100. In particular, ventilation line 190 may be enclosed within cabinet 102. As shown in FIG. 3, exemplary embodiments include ventilation line 190 at a position in fluid communication between tub 120 and the surrounding region (e.g., the ambient environment outside of or immediately surrounding cabinet 102, the enclosed volume of cabinet 102 surrounding tub 120, etc.). Generally, it is understood that ventilation line 190 may be provided as any suitable pipe or conduit (e.g., having non-permeable wall) for directing air therethrough. When assembled, ventilation line 190 defines an air path 192 from tub 120 and within or through cabinet 102 (e.g., to the ambient environment outside of cabinet 102). Specifically, air path 192 extends from a ventilation inlet 194, through cabinet 102, and to a ventilation outlet 196. In some embodiments, ventilation inlet 194 is defined through a top portion of wash tub 120 and ventilation outlet 196 is defined through an upper portion of cabinet 102. Thus, air path 192 may extend from the top portion of tub 120 to an upper portion of cabinet 102. Optionally, ventilation inlet 194 may be positioned below ventilation outlet 196 along a vertical direction V. Advantageously, a convective airflow may be naturally motivated from wash tub 120, through air path 192, and to the ambient environment. Also, such airflow may be aided or urged through the washing machine appliance 100 by rotating the wash basket 122. Additionally or alternatively, splashing of wash fluid and the collection of moisture within air path 192 may be prevented. However, any other suitable configuration may be provided to facilitate the flow of air from tub 120 and, for example, to the ambient environment.

Although a convective airflow may be facilitated, additional example embodiments may further include a fan or blower 198. Specifically, fan 198 may be provided in fluid communication with ventilation line 190 to motivate an active airflow therethrough. For instance, fan 198 may be mounted within ventilation line 190 to selectively rotate and draw air from wash tub 120, through ventilation inlet 194, and to ventilation outlet 196, e.g., to output an airflow from tub 120 to the ambient environment.

A cabinet aperture 202 may be defined through front panel 140 as an inlet for ambient air to flow from outside of the cabinet 102 to the inside of the cabinet 102, e.g., to and through the tub 120. Notably, in the disclosed embodiments, air 1000 (e.g., an ambient airflow) may flow between tub 120 and the ambient environment through cabinet aperture 202 and/or vent line 190 even while door 144 remains closed.

A vent damper 210 may be provided to selectively control an airflow between tub 120 and, for example, the ambient environment. Generally, vent damper 210 is in communication with wash tub 120 and/or ventilation line 190 (i.e., in fluid communication with air path 192). In certain embodiments, vent damper 210 is enclosed, at least in part, within cabinet 102. Vent damper 210 may be selectively controlled or operated to limit or obstruct the flow of air from the ambient environment into the interior of the cabinet 102, such as to the wash tub 120, via the aperture 202 during certain operations, phases, or cycles. Thus, vent damper 210 may selectively limit airflow between tub 120 and the ambient environment, such as airflow from the ambient environment via the aperture 202.

The damper 210 may be positioned downstream of the aperture 202, e.g., between the aperture 202 and the wash tub 120 and/or between the aperture 202 and the gasket 200. Thus, opening the damper 210 may permit fluid communication, e.g., air flow, between internal components of the washing machine appliance 100, e.g., the wash tub 120 and/or the wash basket 122, and the ambient environment external to the cabinet 102. Thus, the damper 210 may be upstream of the internal components, e.g., wash basket 122, with respect to a flow of ambient air 1000 from the ambient environment external to the cabinet 102 through the washing machine appliance 100. As may be seen in FIG. 3, the flow of ambient air 1000 from the ambient environment external to the cabinet 102 through the washing machine appliance 100 may enter the washing machine appliance 100 through the aperture 202, flow through the damper 210, into and through the wash tub 120, e.g., wash basket 122 and wash chamber 124 therein, and may exit the washing machine appliance 100 via the vent line 190, e.g., by flowing into the vent line 190 at the ventilation inlet 194 from the wash tub 120, flowing through the vent line 190, and returning to the ambient environment from the vent line 190 via the ventilation outlet 196. In some embodiments, such air flow may be aided or urged by fan 198.

In additional embodiments, the air flow through the washing machine appliance 100, as illustrated by arrows 1000, may be provided by convective flow and/or rotation of the wash basket 122 without the use or presence of a fan. Such rotation of the wash basket 122, including the ribs 126 therein, may push the air 1000 around to promote circulation of the ambient air 1000 through the washing machine appliance 100, e.g., into and through the wash basket 122. In some embodiments, the fan 198 may not be included, and the flow of ambient air 1000 through the washing machine appliance 100 may be provided solely by natural convection and/or rotation of the wash basket 122.

Figure 4:
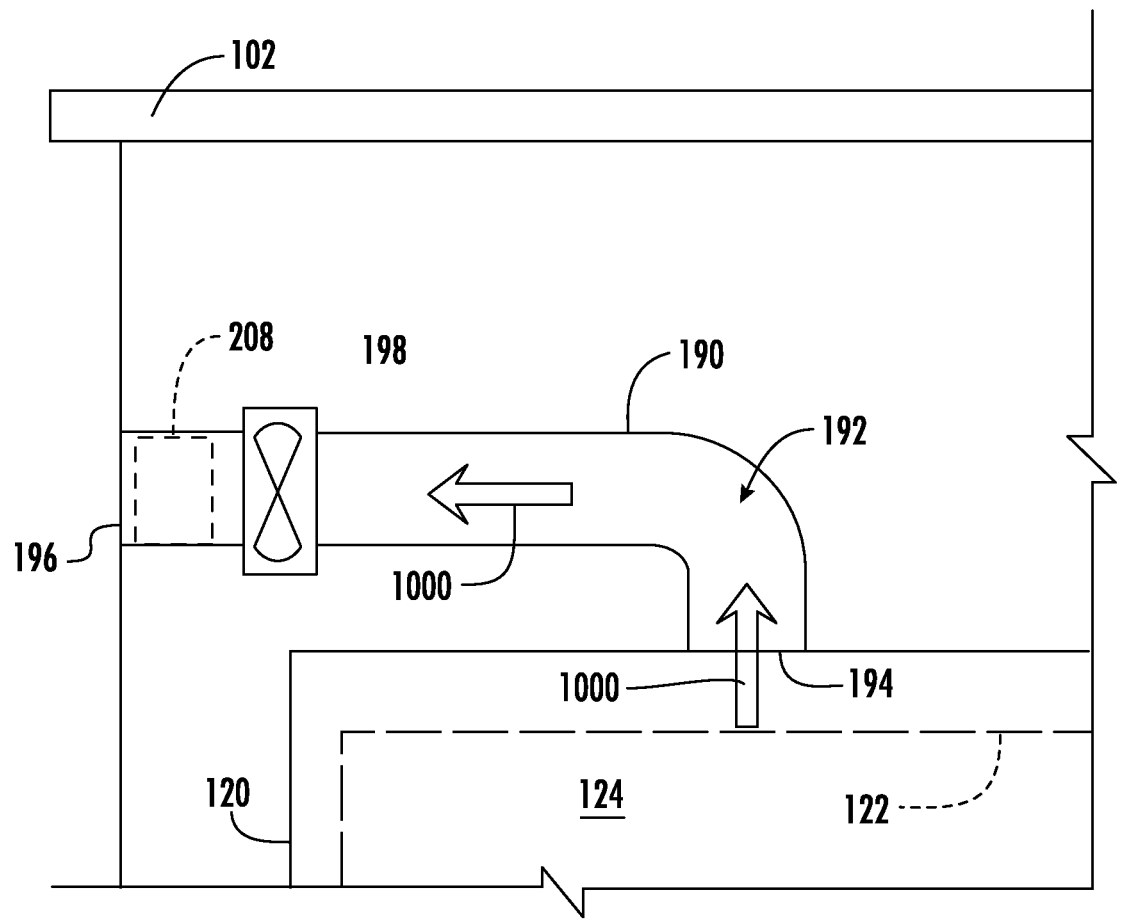
FIG. 4 provides an enlarged view of a portion of the washing machine appliance of FIG. 3 according to one or more exemplary embodiments of the present disclosure.

FIG. 4 illustrates an enlarged view of a portion of the washing machine appliance 100 of FIG. 3. The portion is generally indicated by the oval A in FIG. 3. As illustrated in FIG. 4, the washing machine appliance 100 may include a humidity sensor 208. In some embodiments, the humidity sensor 208 may be a single humidity sensor 208, e.g., may be the only humidity sensor provided in the washing machine appliance 100, and may be operable to measure both an internal humidity level, e.g., a humidity within the washing machine appliance 100 (such as within the cabinet 102 thereof, such as within the wash tub 120 and/or wash basket 122) and a external humidity level, e.g., a humidity outside of the cabinet 102, such as a humidity of an ambient environment external to the cabinet 102. Humidity sensor 208 may be positioned in any suitable location within washing machine appliance 100. Humidity sensor 208 may be any suitable sensor capable of sensing or measuring the humidity or relative humidity in the air. For instance, humidity sensor 208 may be a capacitive, resistive, or thermal sensor.

As mentioned above, the controller 186 may be in operative communication with various other components of the washing machine appliance 100. In particular, controller 186 is in operative communication with humidity sensor 208, fan 198, damper 210, drain pump assembly 156, and motor 130. Accordingly, controller 186 may receive signals from and rout signals to these various components. For instance, controller 186 may receive signals from humidity sensor 208 that are indicative of the humidity or relative humidity of the air measured by the humidity sensor 208. Such signals may be used to make decisions as to whether to activate motor 130 to rotate wash basket 122, e.g., to facilitate air flow through the wash tub 120. Controller 186 can receive the signals directly or indirectly from sensor 208. Moreover, controller 186 may send signals to motor 130, e.g., to rotate basket 122, to fan 198, e.g., to blow air within and/or through vent line 190, to drain pump assembly 156, e.g., to drain liquid from wash basket 122, or controller 186 may send signals to damper 210 to open or close.

In some embodiments, e.g., as illustrated in FIG. 4, humidity sensor 208 may be positioned proximate the ambient environment, such as proximate the ventilation outlet 196. For example, the humidity sensor 208 may be proximate the ambient environment in that the humidity sensor 208 is downstream of the fan 198, e.g., is between the fan 198 and the ventilation outlet 196. As another example, the humidity sensor 208 may be proximate the ambient environment in that the humidity sensor 208 is closer to the ventilation outlet 196 than to the ventilation inlet 194, such as, where a length of the ventilation line 190 is defined from the ventilation inlet 194 to the ventilation outlet 196, the humidity sensor 208 may be positioned at the ventilation outlet 196 or separated from the ventilation outlet 196 by a distance which is ten percent or less of the length of the ventilation line 190. In such embodiments, the humidity sensor 208 may be operable to measure ambient humidity whenever the washing machine appliance 100 is idle, e.g., when the washing machine appliance 100 is not performing a cycle such as a wash cycle. In particular, it may be advantageous to measure the ambient humidity when the washing machine appliance 100 is idle prior to the first wash cycle of the day, and such ambient humidity measurement, e.g., as an original humidity value, may be stored or recorded, e.g., in a memory of the controller 186.

Figure 5:
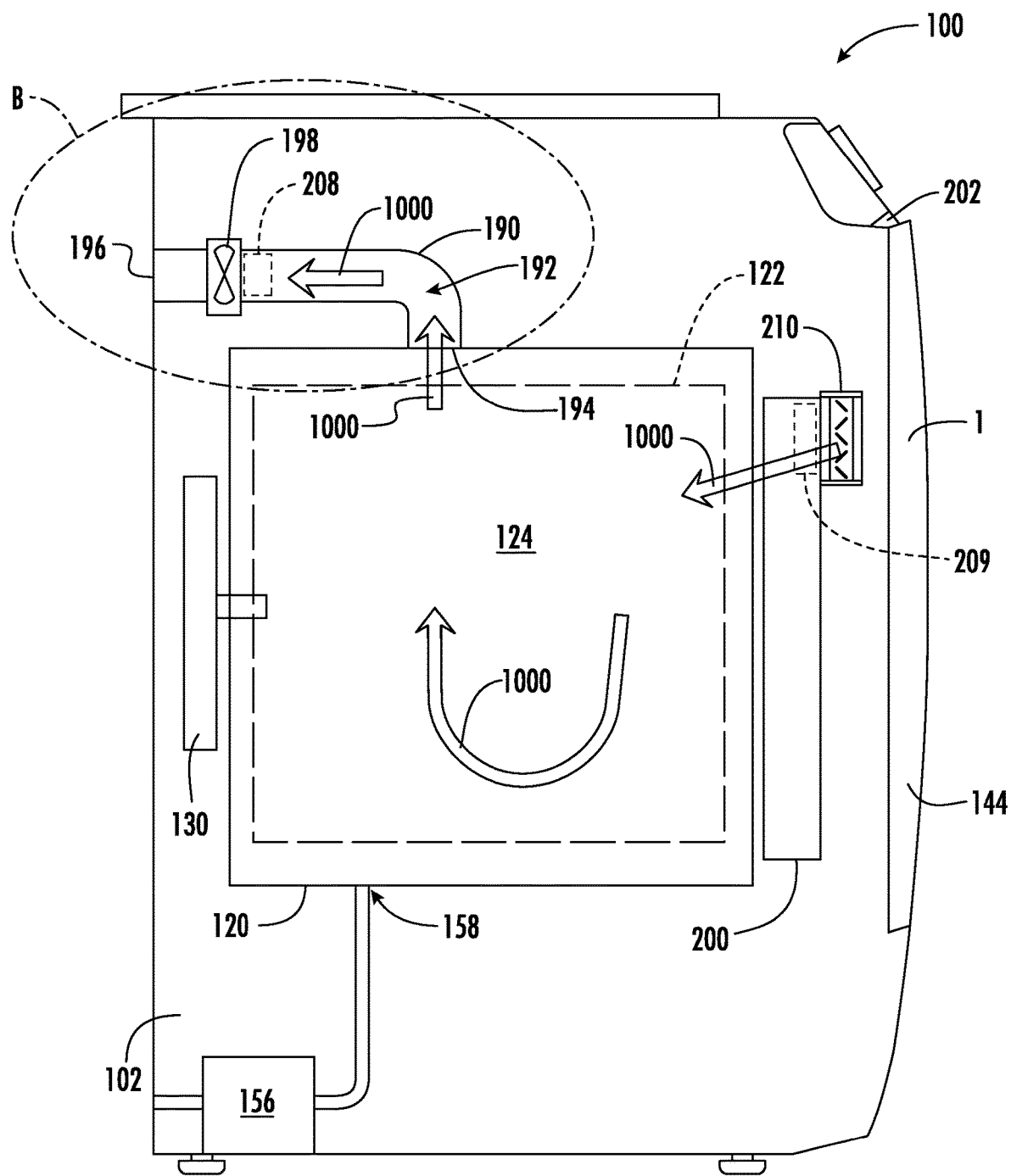
FIG. 5 provides a schematic side view of an exemplary washing machine appliance according to one or more additional exemplary embodiments of the present disclosure.
Figure 6:
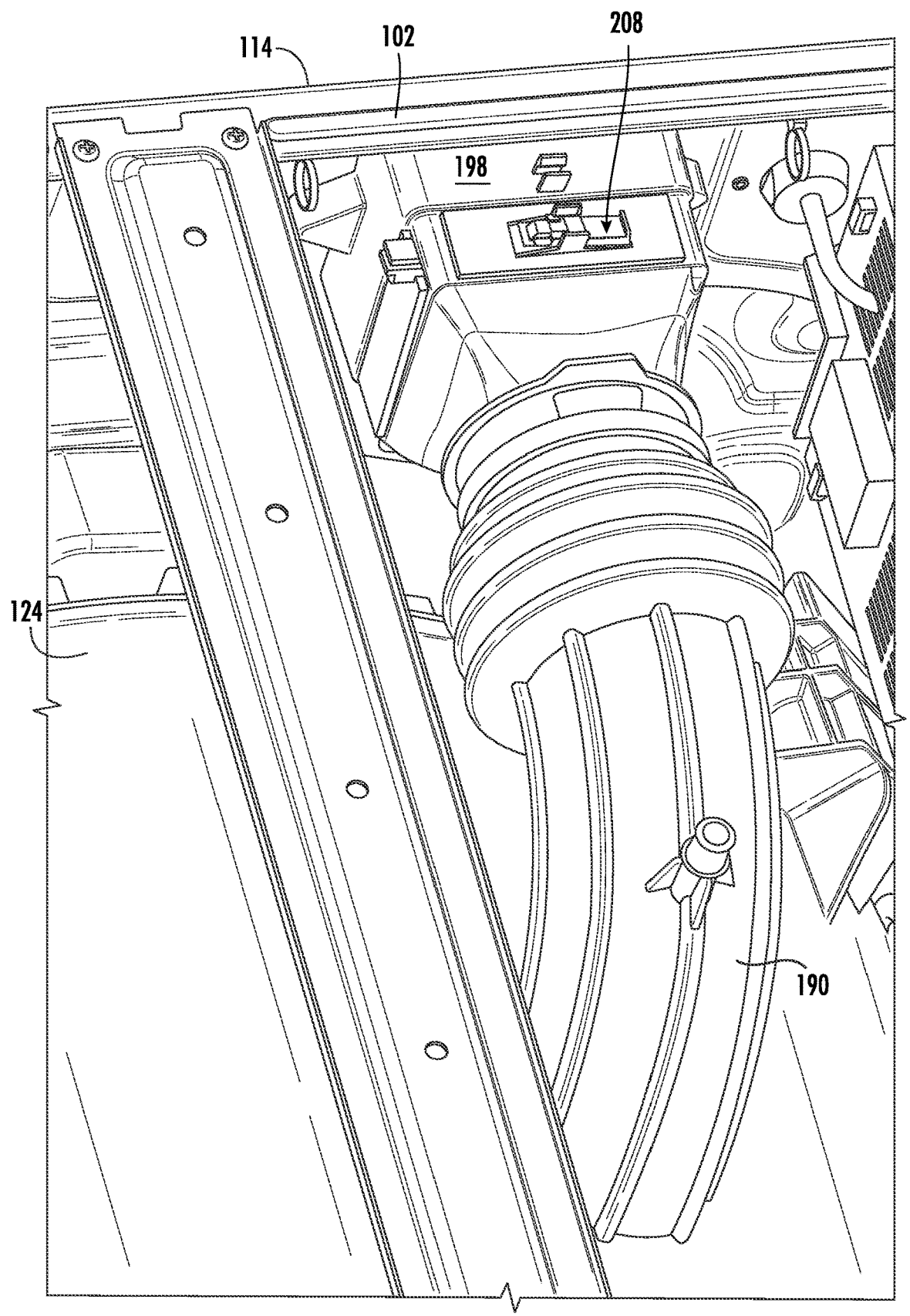
FIG. 6 provides a detailed schematic view of a vent line of FIG. 5.

Additionally, in at least some example embodiments, in particular embodiments where humidity sensor 208 is positioned away from the outlet 196, the humidity sensor 208 may be operable to measure the ambient humidity when ambient air is drawn into the vent line 190, e.g., in the reverse direction of the normal air flow path through the washing machine appliance 100. This may be seen in FIG. 6, which illustrates an enlarged, detailed view of a portion of the washing machine appliance 100 of FIG. 5. The portion is generally indicated by the oval B in FIG. 5. As illustrated in FIG. 6, the washing machine appliance 100 may include a humidity sensor 208 positioned inside, along the direction of vent line 190, of fan 198. Vent line 190 may extend between wash basket 122 and cabinet 102. For example, fan 198 may be operable in two directions, e.g., may be a reversible fan, whereby the fan 198 may be operable to spin in a reverse direction in order to draw ambient air into the vent line 190 via the ventilation outlet 196, whereby the humidity sensor 208 may measure an ambient humidity when the fan 198 is operating in the reverse direction.

Referring again to FIG. 5, in some embodiments, e.g., as illustrated in FIG. 5, the washing machine appliance 100 may include a second humidity sensor 209. In such embodiments, the second humidity sensor 209 may be positioned proximate to the damper 210, such as immediately upstream or immediately downstream (as depicted in FIG. 5) of the damper 210, e.g., between the damper 210 and the gasket 200 or between the damper 210 and the aperture 202. In such embodiments, the first humidity sensor 208 may be used to measure the humidity within the washing machine appliance 100, and the second humidity sensor 209 may be used to measure the ambient humidity.

In the present example embodiment, controller 186 may be operable to perform a drain cycle. The drain cycle may include activating drain pump assembly 156 in order to drain liquid/fluid from basket 122, e.g., drain pump assembly 156 may be configured to urge fluid from basket 122 through drain 158. The drain cycle may also include comparing a difference in humidity within the washing machine appliance to a reference humidity value. For example, after one (1) second to sixty (60) seconds of the drain cycle initiating, the humidity may be measured. The humidity may be measured as a trend across a set interval of time, e.g., at least five (5) seconds. Then, controller 186 may determine that the humidity exceeds the reference humidity, thus detecting a fault in the drain cycle. Additionally or alternatively, controller 186 may determine that the trend in humidity exceeds a reference trend in humidity, thus detecting a fault in the drain cycle. The reference humidity for comparing the humidity may be a stored value on controller 186, e.g., the original humidity value. The fault in the drain cycle may be determined in response to the humidity exceeding the reference humidity, or the trend in humidity not associating with an expected trend, e.g., the humidity is expected to decrease over time after drain pump assembly 156 is activated.

Referring still to FIG. 5, the drain cycle may further include notifying a user in response to the detection of the fault in the drain cycle. The notification to the user may include information about the fault in the drain cycle, e.g., that drain pump assembly 156 is not working as intended and humidity reduction performance of washing machine appliance 100 may he hindered. In other words, the fault in the drain cycle may be associated with the activation of drain pump assembly 156, e.g., the pump is not activating properly thus not removing moisture from the system. Additionally or alternatively, the fault in the drain cycle may be associated with the measurements of the humidity, e.g., humidity sensor 208 is not measuring properly thus communicating wrong humidity measurements to controller 186. The drain cycle may further include termination by controller 186 in response to an action by the user associated with the notification, e.g., the notification may include an option for the user to terminate the drain cycle.

Figure 7:
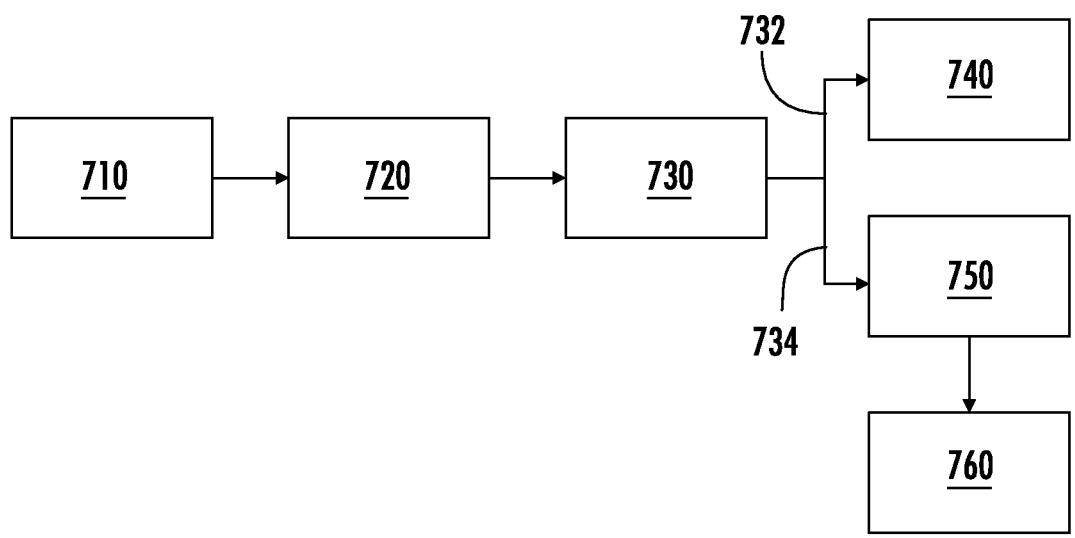
FIG. 7 provides a flowchart of a method of operating the washing machine appliance of FIG. 5.

FIG. 7 depicts a method 700 of operating washing machine appliance 100, such as the example embodiment illustrated in FIG. 5. At 710, controller 186 initiates the drain cycle. The drain cycle includes activating drain pump assembly 156 in order to drain liquid/fluid from basket 122, e.g., drain pump assembly 156 may be configured to urge fluid from basket 122 through drain 158. At 720, humidity sensor 208 measures the humidity in wash basket 122. For example, after one (1) second to sixty (60) seconds of the drain cycle initiating, the humidity may be measured by humidity sensor 208. At 730, controller 186 may compare a prior measured reference humidity and a new humidity. Step 730 may additionally or alternatively compare the humidity as a trend across a set interval of time, e.g., at least five (5) seconds. In other words, controller 186 may compare the humidity to the reference humidity, e.g., the reference humidity for comparing the humidity may be a stored value on controller 186, e.g., the original humidity value.

Depending on the result of step 730, method 700 may proceed to either result 732 or result 734. At result 732, the humidity is compared to be less than the reference humidity, e.g., drain pump assembly 156 and humidity sensor 208 are working and the humidity in basket 122 is decreasing. Whereas, at result 734 the humidity is greater than the reference humidity, e.g., either drain pump assembly 156 or humidity sensor 208 are not working properly and the humidity in basket 122 is not decreasing. In a situation where method 700 proceeds to result 732 then method 700 moves to step 740 and concludes the drain cycle and moves onto a rinse cycle. The rinse cycle will not be described here for the sake of brevity. In a situation where method 700 proceeds to result 734, then method 700 moves to step 750. At 750, in response to result 734 controller 186 may detect the fault in the drain cycle, e.g., in response to the humidity exceeding the reference humidity or the trend in humidity not associating with an expected trend. The expected trend in the humidity is to decrease over time after drain pump assembly 156 is activated. Then, at 760, controller 186 may notify the user of the fault in drain cycle, e.g., either drain pump assembly 156 or humidity sensor 208 are not working properly.

Referring still to FIG. 7, the notification to the user may include information about the fault in the drain cycle, e.g., either drain pump assembly 156 or humidity sensor 208 are not working properly and the humidity in basket 122 is not decreasing. In other words, the fault in the drain cycle may be associated with the activation of drain pump assembly 156, e.g., the pump is not activating properly thus not removing moisture from the system, or the fault in the drain cycle may be associated with the measurements of the humidity, e.g., humidity sensor 208 is not measuring properly thus communicating wrong humidity measurements to controller 186. Alternatively or additionally, method 700 may further include termination of the drain cycle, by controller 186, in response to an action by the user associated with the notification, e.g., the notification may include an option for the user to terminate the drain cycle.

FIG. 7 depict steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Moreover, although aspects of method 700 is explained using washing machine appliance 100 as an example, it should be appreciated that these methods may be applied to the operation of any suitable appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a cabinet;
   a wash tub positioned within the cabinet;
   a wash basket rotatably mounted within the wash tub and accessible through an opening in the cabinet;
   a door pivotably mounted to the cabinet whereby the door is pivotable between an open position and a closed position, wherein the door permits access to the wash basket through the opening when in the open position, and wherein an aperture in the cabinet is in fluid communication with an ambient environment external to the cabinet when the door is in the closed position;
   a pump configured for removing liquid from the wash tub;
   a vent line extending between the wash tub and the aperture on the cabinet, the vent line comprising a fan, and a first humidity sensor disposed in the vent line proximate the fan;

a damper fluidly coupled to the aperture in the cabinet, wherein a second humidity sensor is positioned at the damper; and a controller positioned within the cabinet, the controller configured to:
  activate the pump during a drain cycle of a wash cycle,
  measure, via the first humidity sensor, a humidity during the drain cycle,
  compare, across a set interval of time, the measured humidity within the washing machine appliance to a reference humidity value, the reference humidity value measured via the second humidity sensor at the damper;
  detect the measured humidity from the first humidity sensor exceeding the reference humidity, and
  detect a fault in the drain cycle in response to detecting the measured humidity from the first humidity sensor exceeding the reference humidity value.

2. The washing machine appliance of claim 1, wherein the controller is further configured to notify a user in response to the detection of the fault in the drain cycle.

3. The washing machine appliance of claim 1, wherein the set interval of time for comparing the humidity to the reference humidity is no less than one second and no greater than sixty seconds.

4. The washing machine appliance of claim 1, wherein the reference humidity for comparing the humidity is measured before the drain cycle starts.

5. The washing machine appliance of claim 1, wherein the humidity is an average in humidity measured by the humidity sensor over a period of at least five seconds.

6. The washing machine appliance of claim 1, the fault in the drying cycle comprises one or both of the pump is not activating properly and the humidity sensor is not measuring properly.

7. The washing machine appliance of claim 6, wherein the controller is further configured to notify a user one or both of the pump and the humidity sensor is not operating properly.

8. The washing machine appliance of claim 7, wherein the controller is further configured to terminate the drain cycle in response to a user input after the notification.

9. The washing machine appliance of claim 1, wherein the controller is configured to compare the difference in the original humidity within the washing machine appliance to the reference humidity value immediately after initiation of the drain cycle, the controller further configured to:
  remeasure the humidity within the washing machine appliance during drain cycle;
  compare the remeasured humidity within the washing machine appliance to the original humidity within the washing machine appliance; and
  detect the fault in the drain cycle when the difference in the remeasured humidity and the original humidity within the washing machine appliance is greater than the reference humidity value.

10. The washing machine appliance of claim 1, wherein the controller is further configured to continue the wash cycle in response to the humidity being about equal to the reference humidity.

11. A method of operating a drain cycle in a washing machine appliance, the washing machine appliance comprising a cabinet, a wash tub positioned within the cabinet, a wash basket rotatably mounted within the wash tub and accessible through an opening in the cabinet, a door pivotably mounted to the cabinet whereby the door is pivotable between an open position and a closed position, wherein the door permits access to the wash basket through the opening when in the open position, and wherein an aperture in the cabinet is in fluid communication with an ambient environment external to the cabinet when the door is in the closed position, a pump configured for removing liquid from the wash tub, a vent line extending between the wash tub and the cabinet; a vent line extending between the wash tub and the aperture on the cabinet, the vent line comprising a fan, and a first humidity sensor proximate the fan, a damper fluidly coupled to the aperture in the cabinet, wherein a second humidity sensor is positioned at the damper, and a controller positioned within the cabinet, the method comprising:
  activating, by the controller, the pump during a drain cycle of a wash cycle,
  measuring, via the first humidity sensor, a humidity during the drain cycle,
  comparing, by the controller, across a set interval of time, a difference in a humidity measurement from the humidity sensor to a reference humidity value, the reference humidity value measured via the second humidity sensor at the damper,
  detecting the measured humidity from the first humidity sensor exceeding the reference humidity, and
  detecting, at the controller, a fault in the drain cycle in response to detecting the measured humidity from the first humidity sensor exceeding the reference humidity value.

12. The method of claim 11, further comprising notifying a user in response to the detection of the fault in the drain cycle.

13. The method of claim 11, wherein the set interval of time for comparing the humidity to the reference humidity is no less than one second and no greater than sixty seconds.

14. The method of claim 11, wherein the reference humidity for comparing the measured humidity is measured by the humidity sensor before the drain cycle starts.

15. The method of claim 11, wherein the humidity is an average in humidity measured by the humidity sensor over a period of at least five seconds.

16. The method of claim 11, wherein the fault in the drying cycle comprises one or both of the pump is not activating properly and the humidity sensor is not measuring properly.

17. The method of claim 16, further comprising notifying a user one of the pump and the humidity sensor is not operating properly.

18. The method of claim 17, further comprising terminating, by the controller, the drain cycle in response to a user input after the notification.

19. The method of claim 11, wherein the controller is configured to compare the difference in the original humidity within the washing machine appliance to the reference humidity value immediately after initiation of the drain cycle, the method further comprising:
  remeasuring, by the humidity sensor, the humidity within the washing machine appliance during drain cycle;
  comparing, by the controller, the remeasured humidity within the washing machine appliance to the original humidity within the washing machine appliance; and
  detecting, at the controller, the fault in the drain cycle when the difference in the remeasured humidity and the original humidity within the washing machine appliance is greater than the reference humidity value.

20. The method of claim 11, further comprising continuing the wash cycle in response to the humidity being about equal to the reference humidity.

* * * * *